United States Patent [19]

Ohma

[11] Patent Number: 5,449,188
[45] Date of Patent: Sep. 12, 1995

[54] BICYCLE FRONT WHEEL SUSPENSION

[75] Inventor: Toshio Ohma, Shizuoka, Japan

[73] Assignee: Showa Corporation, Gyoda, Japan

[21] Appl. No.: 209,966

[22] Filed: Mar. 11, 1994

[30] Foreign Application Priority Data

Mar. 18, 1993 [JP] Japan .................... 5-082468

[51] Int. Cl.$^6$ ............................................. B62K 25/08
[52] U.S. Cl. ...................... 280/276; 188/299; 267/218
[58] Field of Search ............ 280/276, 279, 284, 275, 280/280; 188/319, 317, 315, 313, 299, 282, 285, 322.21; 267/218, 217

[56] References Cited

U.S. PATENT DOCUMENTS

| | | | |
|---|---|---|---|
| 4,971,344 | 11/1990 | Turner | 280/276 |
| 5,088,705 | 2/1992 | Tsai | 280/276 X |
| 5,186,481 | 2/1993 | Turner | 280/276 |
| 5,275,264 | 1/1994 | Isella | 280/276 X |
| 5,301,973 | 4/1994 | Truchinski | 280/276 |
| 5,346,236 | 9/1994 | Ohma | 280/276 |

*Primary Examiner*—Eric D. Culbreth
*Assistant Examiner*—F. Zeender
*Attorney, Agent, or Firm*—Dvorak and Traub

[57] ABSTRACT

A front fork assembly having an axially movable partitioning wall member disposed in its lower portion such as to define the lower end of an oil chamber in it. In the front fork assembly, a gas chamber is formed over the oil chamber. An operating pin extends from the partitioning wall member and penetrates a slot in the front fork assembly. An adjusting ring is fitted for axial movement on the front fork assembly and coupled to the operating pin.

2 Claims, 4 Drawing Sheets

1

BICYCLE FRONT WHEEL SUSPENSION

FIELD OF THE INVENTION

The present invention relates to a bicycle front wheel suspension and, more particularly, to a bicycle front wheel suspension, which is capable of changing pneumatic spring reaction forces of the front fork assemblies.

BACKGROUND ART

Prior art off-road bicycles include one in which the front wheel is supported by a front wheel suspension having a buffering mechanism and an attenuating mechanism, as disclosed in Japanese Patent Laid-Open Publication H2-231289. This front wheel suspension comprises a steering bracket rotatably supported in a front portion of the bicycle frame and a pair of, i.e., left and right, front fork assemblies coupled together by the steering bracket. Each of the front fork assemblies includes an inner tube and an outer tube, which are slidable relative to each other. In these tubes, an oil chamber and a gas chamber are formed. Gas in the gas chamber functions as a buffering mechanism, and the oil chamber is provided with an attenuating mechanism.

Regarding this prior art front wheel suspension, when the front fork assemblies are elongated and contracted by impact forces exerted from the front wheel, the gas in the gas chambers in the front fork assemblies functions to absorb the impact forces, while attenuating forces that are generated as the oil in the oil chambers flows through the attenuating mechanisms suppresses the elongating or contracting motion of the front fork assemblies to suppress vibrations.

In the prior art bicycle suspension of this type, in order to provide for desired level of riding comfort, depending on the taste and weight of the rider, an air valve is provided at the upper end of each front fork assembly for changing the gas pressure (i.e., air pressure) in the gas chambers, thus adjusting the pneumatic spring reaction force.

In the above prior art front wheel suspension, in order to pressurize the inside of the gas chambers, a gas supply (i.e., an air supply) has to be connected to the gas valves. In addition, for reducing pressure in the gas chambers, an exhausting means has to be mounted on the gas valves. Since the gas chamber pressure adjustment requires the accessory equipment such as the gas supply and exhausting means, it is impossible to adjust the pneumatic spring reaction force while the bicycle is in use.

DISCLOSURE OF THE INVENTION

The present invention contemplates the above drawbacks inherent in the prior art, and has an object of providing a bicycle front wheel suspension which permits adjustment of the pneumatic spring reaction force of the front fork assembly with a simple structure.

According to the present invention, there is provided a bicycle front wheel suspension comprising a pair of front fork assemblies capable of being elongated and contracted. Each fork assembly includes an inner tube and an outer tube, these tubes being slidable relative to each other, and a steering bracket coupling together the two front fork assemblies and having a steering shaft. The lower ends of the front fork assemblies are capable of supporting a front wheel, each front fork assembly including an axially movable partitioning wall member provided in its lower portion such as to define the lower end of an oil chamber, a gas chamber being formed over the oil chamber, an operating member extending from the partitioning wall member and penetrating it, and an axially movable adjusting member coupled to the operating member.

In the bicycle front suspension according to the present invention, by moving the adjusting member in the axial direction of the front fork assembly, the partitioning wall member is moved in the front fork assembly in the axial direction thereof, via the operating member. As a result, the head level in the oil chamber is changed, thereby changing the volume of the gas chamber, thus permitting adjustment of the pneumatic spring reaction force in the gas chamber.

At this time, a gas supply for supplying gas to the gas chamber or an exhausting means for exhausting gas from the gas chamber is unnecessary. It is thus possible to permit adjustment of the pneumatic spring reaction force of the front fork assembly, with simple structure, while the bicycle is in use.

BRIEF DESCRIPTION OF THE DRAWINGS

The present invention will be more fully understood from the detailed description given below and from the accompanying drawings which should not be taken to be a limitation on the invention, but for explanation and understanding only.

The drawings.

DETAILED DESCRIPTION OF THE PREFERRED EMBODIMENT

Now, an embodiment of the invention will be described with reference to the drawings.

Figure 2:
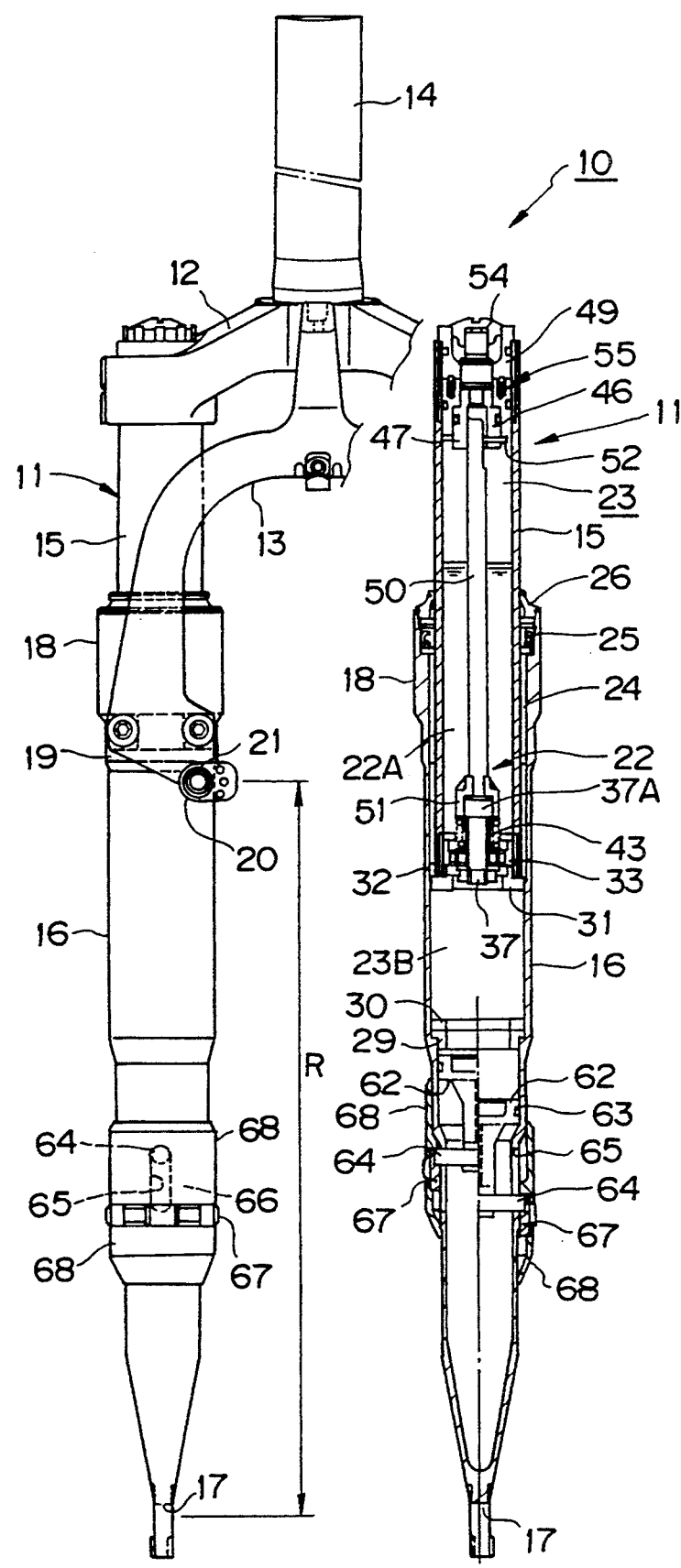
FIG. 2 is a front view, partly broken away, showing a front fork incorporating an embodiment of the bicycle front wheel suspension according to the invention.

As shown in FIG. 2, a front fork, generally designated at 10 as the front wheel suspension, comprises two front fork assemblies 11 which are coupled together by a steering bracket 12 and a cross member 13. The lower end of each front fork assembly 11 supports the axle of the front wheel (not shown). The steering bracket 12 has a steering shaft 14, which is supported rotatably on a head pipe (not shown) of the bicycle frame for steering. A handle bar (not shown) is secured to the upper end of the steering shaft 14.

Each of the front fork assemblies 11 includes an inner and an outer tube 15 and 16, these tubes being slidably coupled together for elongation and contraction. The lower end of the outer tube 16 has an axle support section 17 which supports the axle of the front wheel. The inner tube 15 is coupled to the steering bracket 12 with its upper end inserted in a hole formed in the steering bracket 12 and secured to the same by a bolt.

Figure 3:
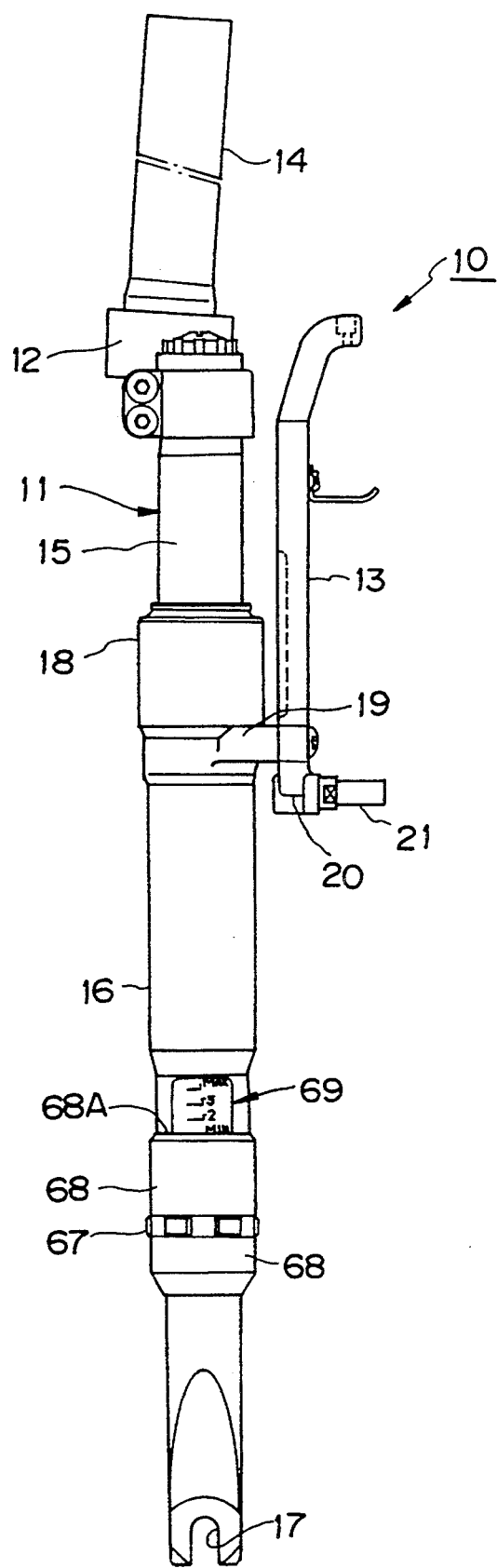
FIG. 3 is a sectional view showing the front fork shown in FIG. 2.

The outer tubes 16 each have an upper end increased diameter portion 18, and also have a cross member holder 19 under the increased diameter portion 18, as shown in FIG. 3. A U-shaped cross member 13 is mounted in the cross member holders 19 of the two front fork assemblies 11. The cross member 13 makes up for insufficient rigidity of the front fork due to the fact that each front fork assembly comprises two divisions, i.e., the inner and outer tubes 15 and 16. In addition, when braking the bicycle, it supports brake reaction forces exerted via brake holders 21.

The opposite ends of the cross member 13 each have an integral brake mounting boss 20 which projects from a location at a distance corresponding to the front wheel radius R from an axle support 17. A brake holder 21 is mounted on the brake mounting boss 20. A brake bar (not shown) provided with a brake pad (not shown) is rotatably supported by the brake holder 21.

Figure 1:
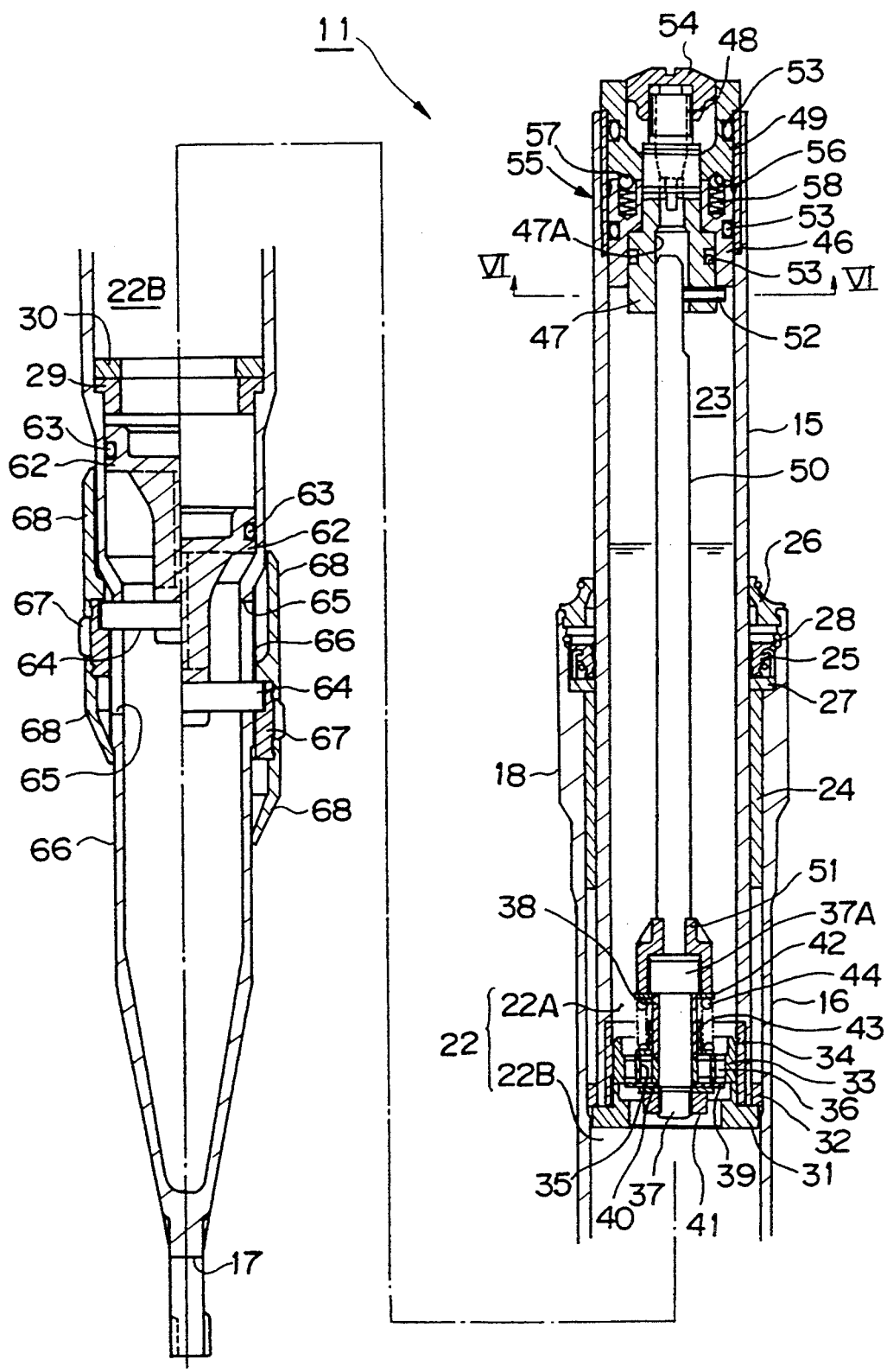
FIG. 1 is a sectional view showing part of FIG. 2 on an enlarged scale.

As shown in FIG. 1, in each front fork assembly 11, an oil chamber 22 filled with oil and an air chamber 23 as a gas chamber filled with air are formed in the inner and outer tubes 15 and 16. The oil chamber 22 is divided by a piston 33 into an upper and a lower oil chamber 22A and 22B. The bottom of the oil chamber 22 is defined by a partitioning wall member 62, and the top of the air chamber 23 is defined by a closing member 46 and valve case 47.

A guide bush 24 is pressure fitted in the inner periphery of an upper portion of the outer tube 16. The inner periphery of the guide bush 24 is in frictional contact with the outer periphery of the inner tube 15, and the outer tube 16 is slidable relative to the inner tube 15. An oil seal 25 and a dust seal 26 are mounted in the inner periphery of the increased diameter portion 18 of the outer tube 16. The oil seal 25 is held in position by a seal spacer 27 and a seal stopper ring 28. The seal spacer 27 prevents oil leakage, and the dust seal 26 prevents intrusion of dust and mud.

A bottom metal member 29 is pressure fitted in the outer tube 16 substantially at an axially central position thereof, and a resilient bumper 30 is disposed on top of the bottom metal member 29. A stopper member 31 is fitted in the lower end of the inner tube 15. The stopper member 31 is in contact with the bottom metal member 29 via the resilient bumper 30, thereby defining the end of the contraction stroke of the front fork assembly 11. A rebound bumper 32 is fitted on the outer periphery of the lower end of the inner tube 15. The end of the elongation stroke of the front fork assembly 11 is defined as the rebound bumper 32 strikes the guide bush 24.

Figure 4A:
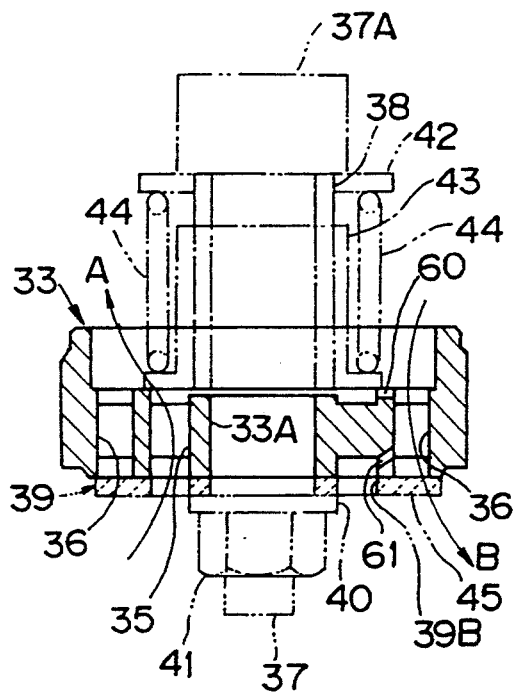
FIG. 4A is a sectional view, on an enlarged scale, showing a piston shown in FIG. 1.
Figure 4B:
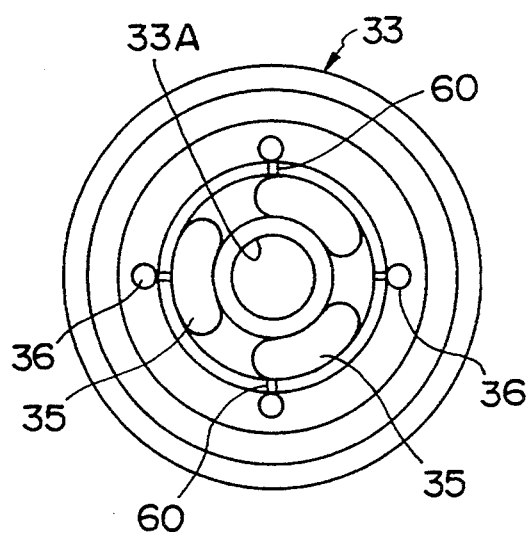
FIG. 4B is a plan view showing the piston shown in FIG. 4A.

The piston 33 is disposed in a lower end portion of the inner tube 15 and is held in position by the stopper member 31 and a stopper ring 34. As shown in FIGS. 4A and 4B, the piston 33 has a central bore 33A, around which are formed contraction side flow paths 35, around which are formed in turn elongation side flow paths 36. The contraction side flow paths 35 are arcuate in shape. In this embodiment, three contraction side flow paths 35 are provided. The elongation side flow paths 36 are circular in shape. In this embodiment, four elongation side flow paths 35 are provided around the three contraction side flow paths 35.

A bolt 37 is inserted in the central bore 33A of the piston 33. A collar 38 is fitted on the bolt 37 between the head 37A thereof and the piston 33. A second valve 39 and a valve retainer 40 are fitted on an end portion of the bolt 37, and a clamp nut 41 is screwed on the end of the bolt 37. The bolt 37, collar 38, second valve 39 and valve retainer 40 are integral with the piston 33.

A spring receptacle 42 and a first valve 43 are fitted on the outer periphery of the collar 38 for movement in the axial direction of the collar 38. A valve spring 44 is interposed between the spring receptacle 42 and first valve 43. The valve spring 44 can close the contraction side flow paths 35, as shown in FIG. 4A.

In the contraction stroke of the front fork assembly shown in FIG. 1, the outer tube 16 is moved upward in FIG. 1 by an impact force from the front wheel. At this time, the pressure in the lower oil chamber 22B is increased to open the first valve 43 against the biasing force of the valve spring 44, thus causing oil in the lower oil chamber 22B to travel through the contraction side flow paths 35 to the upper oil chamber 22, as shown by arrow A in FIG. 4A. As a result, air in the air chamber 23 is compressed, thus absorbing the impact force noted above with pneumatic spring force. At the same time, an attenuating force is generated in the piston 33 by a resistance against flow while oil flows through the contraction side flow paths 35.

Figure 5:
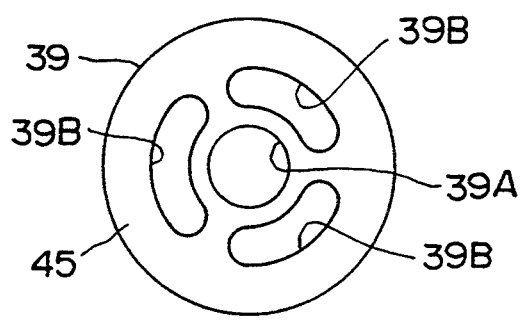
FIG. 5 is a plan view showing a second valve shown in FIG. 1.

The second valve 39, as shown in FIG. 5, has a central hole 39A and arcuate holes 39B formed therearound. As shown in FIG. 4A, the arcuate holes 39B are formed such that they correspond to the contraction side flow paths 35 in the piston 33 in the mounted state of the second valve 39. In the mounted state of the second valve 39, an outer ring portion 45 can close the elongation side flow paths 36 of the piston 33.

Thus, when a negative pressure is produced in the lower oil chamber 22B in the elongation stroke of the front fork assembly 11 shown in FIG. 1, the second valve 39 is deformed, by flexing, to open the elongation side flow paths 36, thus leading oil in the upper oil chamber 22A through the elongation side flow paths 36 to the lower oil chamber 22B as shown by arrow B in FIG. 4A. At this time, an attenuating force is generated by the flow resistance against the flow of oil through the elongation side flow paths 36. The attenuating force that is generated while the front fork assembly 11 is elongated and contracted, tends to suppress the elongating or contracting motion of the front fork assembly 11.

Further, as shown in FIGS. 4A and 4B, the piston 33 is formed with either slits 60 or orifices 61. With these slits 60 and/or orifices 61, the contraction and elongation side flow paths 35 and 36 are in communication with one another at all times, thus permitting the front fork assembly 11 to be moved without resistance for elongation and contraction.

As shown in FIG. 1, a closing member 46 is fitted in the inner periphery of an upper portion of the inner tube 15, and a valve case 47 is rotatably fitted in the closing member 46. The valve case 47 accommodates an air or gas valve 48, and on its outer periphery is fitted with an adjusting sleeve 49 for rotation in unison.

Figure 6:
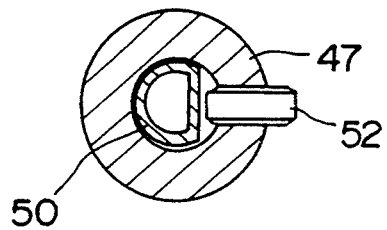
FIG. 6 is a sectional view taken along line VI—VI in FIG. 1.

An adjusting rod 50 has one end portion inserted in a central hole 47A of the valve case 47 and another end portion pressure fitted in an adjusting nut 51. The adjusting rod 50 has one end having a crescent sectional profile as shown in FIG. 6, and is coupled by a coupling pin 52 to the valve case 47 for rotation in unison with and movement in the axial direction of the valve case 47. The adjusting nut 51 is screwed on the outer periphery of the head 37A of the bolt 37, and its end is in contact with the spring receptacle 42.

By rotating the adjusting sleeve 49, the adjusting nut 51 is rotated via the valve case 47 and adjusting rod 50.

The adjusting nut 51 thus moves the spring receptacle 42 in the axial direction of the bolt 37. As a result, the initial pressure applied from the valve spring 44 to the first valve 43 is changed. In this way, the amount of oil that flows through the contraction side flow paths 35 while the front fork assembly 11 is contracted, is controlled in order to adjust the contraction side attenuating force of the front fork assembly 11.

O-rings 53 are fitted on the outer periphery of the closing member 46 and adjusting sleeve 49, thus maintaining the air chamber 23 gas tight. Further, air is supplied to the air chamber 23 through the air valve 48 and central bore 47A. A valve cap 54 is mounted at the upper end of the valve case 47 accommodating the air valve 48.

A click rotation mechanism 55 is provided between the abutting surfaces of the closing member 46 and adjusting sleeve 49. The click rotation mechanism 55 includes a plurality of recesses 56 formed in a circumferential arrangement in the lower end face of the adjusting sleeve 49, and a plurality of balls 57 provided on the top surface of the closing member 46, such that they are biased by a spring 58. As the adjusting sleeve 49 is rotated, the balls 57 are intermittently engaged in the recesses 56, and thus the adjusting sleeve 49 is rotated by click rotation.

The partitioning wall member 62 which defines the lower end of the oil chamber 22 in the front fork assembly 11 is movable in a lower portion of the outer tube 16 in the axial direction thereof. An O-ring 63 is fitted on the outer periphery of the partitioning wall member 62, making the interface between the partitioning wall member 62 and outer tube 16 liquid tight. An operating pin 64 is engaged as an operating member in the partitioning wall member 62. The operating pin 64 extends in a direction perpendicular to the axis of the outer tube 16 and penetrates a slot 65 formed therein. The slot 65, as shown in FIG. 2, extends in the axial direction of the outer tube 16.

The outer tube 16 has a thread 66 formed in its outer periphery, in an area in which the slot 65 is formed. An adjusting ring 67 is screwed, as an adjusting member, on the thread 66. The adjusting ring 67 is movable in the axial direction of the outer tube 16. The end of the movable pin 64 can movably strike and be locked by the adjusting ring 67. By moving the adjusting ring 67 in the axial direction of the outer tube 16 via the thread 66, the position of the partitioning wall member 62 is changed, thereby changing the oil level of the head in the upper oil chamber 22A, so as to change the initial volume of the air chamber 23.

A dust cover 68 is fitted on the adjusting ring 67 to cover the slot 65 and thread 66 of the outer tube 16. Further, as shown in FIG. 3, the outer tube 16 has a scale 69 formed on its lower portion. The upper end 68A of the dust cover 68 serves as a pointer with respect to the scale 69 to indicate the position of the partitioning wall member 62.

The operation will now be described.

By moving the adjusting ring 67 in the axial direction of the outer tube 16, i.e., upward in FIG. 1, via the thread 66, the partitioning wall member 62 is moved upward to move the oil level of the head of the upper oil chamber 22A upward, so as to reduce the initial volume of the air chamber 23. As a result, the pneumatic spring reaction force in the air chamber 23 is increased. It is thus possible to increase the pneumatic spring reaction force.

By moving the adjusting ring 67 in the axial direction of the outer tube 16, i.e., downward in FIG. 1, the partitioning wall member 62 is also moved downward to increase the volume of the air chamber 23, thus reducing the pneumatic spring reaction force in the air chamber 23. Thus, it is possible to decrease the pneumatic spring reaction force.

In the above embodiment, the partitioning wall member 62 defining the lower end of the oil chamber 22 in the front fork assembly 11 is made movable in the axial direction of the outer tube 16 by the adjusting ring 67 via the operating pin 64, thus changing the initial volume of the air chamber 23 to change the pneumatic spring reaction force in the gas chamber 23.

Since the pneumatic spring reaction force in the air chamber 23 can be changed by rotating the adjusting ring 67 to displace it in the axial direction of the outer tube 16, unlike the prior art, accessory equipment such as a gas supply (i.e., air supply) or exhausting means is unnecessary. Thus, it is possible to simplify the structure for pneumatic spring reaction force adjustment while permitting adjustment of the pneumatic spring reaction forces of the front fork assemblies 11 while the bicycle is in use.

With the dust cover 68 provided on the adjusting ring 67 to cover the slot 65 and thread 66, it is possible to protect the slot 65 and thread 66.

Since the upper end 68A of the dust cover 68 is used as a pointer for the scale 69, it is possible to grasp the adjusted position of the partitioning wall member 62 and thus instantly obtain a desired pneumatic spring reaction force.

In the above embodiment, the movable partitioning wall member 62, operating pin 64, and adjusting ring 67, are provided in each of the two front fork assemblies 11 of the front fork 10. However, it is possible to provide these parts in a single front fork assembly 11. Further, the invention is applicable as well to an inverted front fork.

With the bicycle front wheel suspension according to the invention, it is possible to permit adjustment of the pneumatic spring reaction force of the front fork assembly with a simple structure.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A bicycle front-wheel suspension comprising a pair of front fork assemblies capable of being elongated and contracted, each front fork assembly having an inner tube and an outer tube, the inner and outer tubes being slidable relative to each other and forming an upper and lower tube, a steering bracket coupling together the two front fork assemblies and having a steering shaft, lower ends of the front fork assemblies being capable of supporting a front wheel, an axially slidable partitioning wall member provided in a lower part below the upper tube a lower end of an oil chamber formed above the partitioning wall member in the lower tube of each front fork assembly, an air chamber formed above the oil chamber in the upper tube of of each front fork assembly by means of the partitioning wall member, an operating member being extended from the partitioning wall member to pass through the lower tube of each front fork assembly in engagement with a thread on an outer periphery of the lower tube of each front fork assembly, and an axially movable adjusting ring connected to the operating member to axially adjust the position of the partitioning wall member with axial movement thereof.

2. A bicycle front wheel suspension according to claim 1, wherein the operating member connecting the partitioning wall member and the adjusting ring is an operating pin which penetrates through a slot provided in the lower tube of each front fork assembly;

a dust cover provided on the adjusting ring covers the slot and the thread; and an upper end part of the dust cover serves as a pointer on a scale provided on the outer periphery of the lower tube of each front fork assembly to indicate the position of the partitioning wall member.

* * * * *